W. K. EVANS.

Assignor to himself, J. Y. ANTHONY, A. A. EVANS & H. F. WALKER.

SPINNING RING.

No. 10,519. Reissued Sept. 2, 1884.

Witnesses.
John Edwards
W. L. Stanley

Inventor.
William K Evans
By James Shepard
Atty.

UNITED STATES PATENT OFFICE.

WILLIAM K. EVANS, OF BERKLEY, MASSACHUSETTS, ASSIGNOR TO HIMSELF, AND JAMES Y. ANTHONY, ABBY ANN EVANS, AND HENRY F. WALKER, OF TAUNTON, MASSACHUSETTS.

SPINNING-RING.

SPECIFICATION forming part of Reissued Letters Patent No. 10,519, dated September 2, 1884.

Original No. 272,868, dated February 27, 1883. Application for reissue filed December 1, 1883.

*To all whom it may concern:*

Be it known that I, WILLIAM K. EVANS, of Berkley, in the county of Bristol, of the State of Massachusetts, have invented a new and useful Improvement in Spinning-Rings; and I do hereby declare the same to be described in the following specification and represented in the accompanying drawings, of which—

Figure 1:
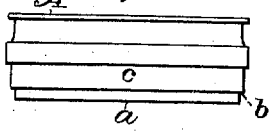
Figure 2:
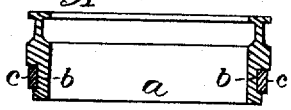
Figure 3:
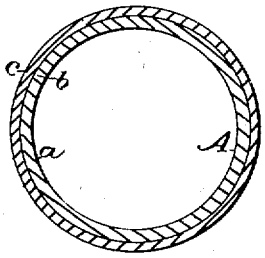

Figure 1 is a side view of my spinning-ring. Fig. 2 is a transverse section thereof, and Fig. 3 is a horizontal section thereof.

The main portion or body of the ring, instead of being of cast iron or steel, is composed of glass, glazed earthenware, or porcelain, preferably of the latter. The neck or holding-shank by which my spinning-ring is received in the ring-rail of a spinning-frame is encompassed by a metallic ring, which forms the periphery of said shank. I prefer to form this metal ring of what is termed "Babbitt metal" or "type-metal," or a composition of lead and tin.

In making my spinning-ring the shank thereof may be grooved to receive and hold the metallic ring, or such neck or shank may be notched to preserve the metal in place and prevent it from accidentally separating from the shank or turning around thereon, the metallic ring being cast or founded on the glass or earthenware.

The purpose of the metallic ring is not only to strengthen the spinning-ring of a material as described, but to prevent it from being crushed by the screws used for confining it in the ring-rail of a spinning-frame. The soft-metal ring or re-enforce will readily yield to the pressure of the point of each of the confining-screws, and thus it will operate to prevent the breakage of the spinning-ring under pressure of said screws or when dropped upon a floor.

The metallic ring may be turned on its outer surface cylindrical and eccentric to the race of the spinning-ring, and thus be used as a means of effecting adjustment of said ring or the race thereof into concentricity with the spindle. A spinning-ring having two races, and made of glass, glazed earthenware, or porcelain, may have arranged around its neck and between the two races a soft-metal ring or re-enforce, as set forth.

In the drawings, A designates a spinning-ring, which is supposed to be made of glass, glazed earthenware, or porcelain, its neck or shank *a* being grooved around it, and having cast in the groove *b* or otherwise fixed thereon a soft-metal ring, *c*, to furnish a metallic periphery for the shank, against which the holding-screws impinge.

In practice it has been found that a spinning-ring composed of glass, earthenware, or porcelain will not only resist the wear of the traveler as well if not much better than will a ring of metal, but that it can be made very much cheaper, and when its shank has a metal periphery, as set forth, it can be used to great advantage, and is very durable, and will not be easily broken or cracked by the means used in confining said shank in the socket of the rail of a spinning-frame. Therefore

What I claim as my invention is as follows, viz:

1. As a new or improved manufacture, a spinning-ring made of glass, glazed earthenware, or porcelain, and grooved in and around its shank or neck, in combination with a soft-metal ring, band, or re-enforce arranged in and around the groove, all being substantially as set forth.

2. As a new article of manufacture, a spinning-ring made of glass, glazed earthenware, or porcelain, and having the shank *a* provided with a periphery of soft metal, substantially as described, and for the purpose specified.

WILLIAM K. EVANS.

Witnesses:

WM. H. FOX,

BENJ. E. WALCOTT.